UNITED STATES PATENT OFFICE.

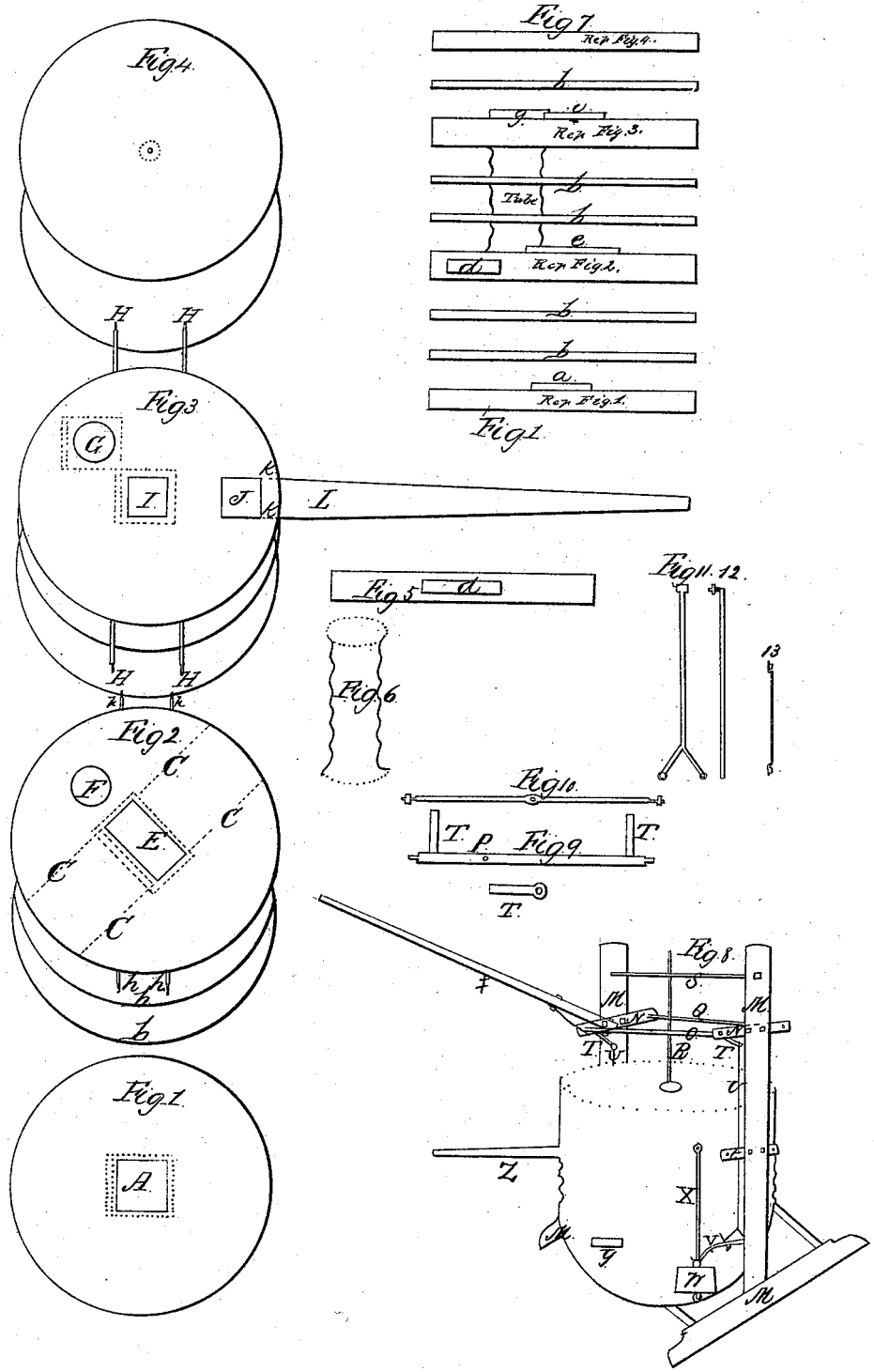

WILLIAM LILLIE, OF EDWARDS, NEW YORK.

DOUBLE BELLOWS.

Specification of Letters Patent No. 4,066, dated June 2, 1845.

*To all whom it may concern:*

Be it known that I, WILLIAM LILLIE, of the town of Edwards and county of St. Lawrence and State of New York, have invented or produced a new Plan of Double-Acting Bellows; and I do hereby declare that the following is a full and exact description of the same.

Figure 1 represents the bottom of the bellows made of two inch plank 2 feet 3 inches in diameter. The square A, represents the orifice which admits the wind into the bellows between the first and second heads. The dotted line around the square A shows the size of the valve and the double dotted line shows the side on which the valve is hung. The same may be observed in Figs. 2, and 3.

Fig. 2 represents the second head which is placed at the distance of eleven inches from the first, with the two hoops *b b* placed at equal distances between, viz. from the first head to the first hoop 3 inches, hoop 1 inch, between the hoops 3 inches, second hoop 1 inch, then to the second head. 3 inches. The second head is made of 3 inch plank with an opening cut through the entire diameter of the head, in the direction of the dotted lines C, C, C, C, and as represented in Fig. 5, by the parallelogram *d*, being 8 inches by 1¼ inches, the opening at E, is cut so as to meet the last mentioned opening *d*, and admits the wind into the second apartment of the bellows, between the second and third heads. F, is an orifice to which is attached a leather tube, which is extended by 5 wire hoops which are bound with thin leather and sewed fast to the inside of the tube. This tube is fastened to the top of the second and bottom of the third heads by nailing, and serves to conduct the wind from the first to the third apartment of the bellows and discharges at G, in Fig. 3. The tube is 5 inches in diameter and 13 inches in length, and as represented by Fig. 6 when extended.

Fig. 3 represents the third head with its intervening hoops as stated above. The orifice at I admits the wind from the second to the third apartments of the bellows. J is an orifice cut down into the plank and out at the side, in the direction of the dotted lines *k, k*, to convey the wind into the pipe L, which conducts the wind into the fire. Fig. 3 is made of 3 inch plank.

Fig. 4 represents the top of the bellows, with 1 or 2 intervening hoops as may be required, according to what work it is mostly to be used, the same rule may be observed with regard to the distance between the hoops and heads as mentioned above throughout the bellows, and as shown in Fig. 7.

Fig. 5 represents the side of Fig. 2, with the orifice *d*, which has been described.

Fig. 6, has been explained in connection with Figs. 2 and 3.

Fig. 7, represents the sides of the heads and hoops as they are placed in the bellows and as would be seen by looking directly into it, before the leather is put on, *a* represents the valve at A, in Fig. 1, *b* represents the sides of the hoops, *d* the opening cut through Fig. 2, and shown in Fig. 5 at *d*, *e* the valve at E in Fig. 2. *g* and *i*, the valves at G, and I in Fig. 3. The part marked tube shows the whole extent of the tube and the manner in which it is placed in the bellows. This figure shows the bellows extended something near 11 inches more than when the cramps are put on, and just the length required to be covered with leather.

N. B.—The foregoing figures are all laid off a scale of 1½ inches to a foot. And those to be described are from a scale of 1 inch to a foot, so that if any omission is made in specifying it may be ascertained by applying to the scale.

Fig. 8, is a left hand side view of the bellows when fit for use being placed a little in front of the post of the frame with the eye elevated a little above the lower end of the pole the letters M represent the frame which is made of timber sawed 4 inches by 2, and is 4 feet 3 inches high and 2 feet 11 inches between the posts, length of the foot of the post is 2 feet 3 inches, from the bottom to the center of the plate marked † is 2 feet. From center of the plate † to center of plate N, is 1 foot 7 inches. The plates marked N, are each 1 foot long 2 inches wide and ½ inch thick let into the posts ¼ of an inch and fastened to the posts with bolts and screws, into one end of which the bar to which the arms are attached are placed, and in the other end a rod is placed and fastened on each end by screw nuts, to support the frame. O, represents the bar mentioned and as shown in Fig. 9, being 2 feet 10½ inches between the shoulders and 1¾ inches from the shoulders to the arms, and 10 inches from the shoulder to the place of fastening on the pole as at P. Q the brace rod above named. R, a rod fastened to the top of the bellows by means of a plate, and running perpendicular through the brace rod S to steady the top of the bellows. The rod S serves also to support the frame, being fastened with a nut and screw on each end. T, the arms that work the bellows, which are welded fast to the bar O, and is 5½ inches from the bar to the eye in the arm as shown by the side view of the arm. U, U, are the rods which are used to work the bellows in connection with the arms, being bent at the upper end so as to pass through the eye of the arms, and a nut put on the end to prevent their dropping out of the eyes, as shown by Fig. 12, they are 2 feet 4 inches in length. The lower ends are fixed on to the gudgeons which project from the second head as shown in Fig. 2, at $h\ h\ h\ h$, and like the upper ends are fastened on with screw nuts, represented by Fig. 11. The gudgeons go through the eyes shown in the lower ends of Fig. 11, and the nuts are put on to the gudgeons. V, the hooks on which the weights are hung, which are fastened on to one of the gudgeon and passing over and turning out from the bellows 6 inches. W the weights 20 lbs. on each side X, the cramps fastened to the first and third heads of the bellows to keep them at a proper distance there are three cramps placed at equal distances from each other, which are 16½ inches in length from center to center of the bolt holes. They are fastened to the 1 and 3 heads by means of bolts with coarse screws cut of them and screwed into the heads.

Fig. 13 shows a side view of the cramps Y the opening at $d$ Fig. 5. Z the pipe made of leather except a few inches at each end which should be sheet iron, length of pipe 3½ feet. † the lower plates on the post of the frame 8 in. long by 2 inches wide and ½ in. thick and are let into the posts and are fastened on in the same manner as the posts N N above described. The use of these plates is to hang the bellows and receives the gudgeons H, H, H, H, as shown in Fig. 3 which projects 4 inches from the $p$ bellows to the plates and are driven into the wood 6 inches and are 7 inches apart and by these is the bellows hung ‡ pole which is 4 feet 8 inches long 2 inches square at the lower end and tapering to 1¼ inches at the upper end with a brace running from the lower side of the bar O (to which the pole is fastened) and running along the lower side of the pole 9 inches and fastened at each end with bolts and screws.

The particular advantages of the double acting bellows over the old fashioned bellows are as follows, viz, when the pole is borne down it raises the second head and discharges the wind from the second to the third apartment through the orifice J in Fig. 3, and at the same time fills the first apartment through the orifice at J in Fig. 1 and when the pole is raised it discharges the wind from the first to the third apartment of the bellows through the tube and discharges at G in Fig. 3 and at the same time fills the second apartment through the opening at E in Fig. 2 which causes a constant pressure into the upper part of the bellows and consequently causes a constant and steady blast into the fire so that there is no danger of sucking fire into the bellows as is frequently the case with the old fashioned bellows and produces a heavier and steadier blast.

I will also state that besides using it for block melting I anticipate using it for forges, pocket furnaces, and cupolas by making it on an enlarged scale and rigging to go by water.

What I claim as my invention and desire to secure by Letters Patent is—

The manner in which I have combined the apartments of the bellows by means of the flexible tube, and the arrangement of the apertures and valves as set forth.

WM. LILLIE.

Witnesses:
TH. LAIDLAW,
ELI J. DAVIS.